(12) United States Patent
Friedrich

(10) Patent No.: US 10,913,619 B2
(45) Date of Patent: Feb. 9, 2021

(54) PNEUMATIC MAILING TUBE WITH INSERT

(71) Applicant: ING. SUMETZBERGER GMBH, Vienna (AT)

(72) Inventor: Peter Friedrich, Vienna (AT)

(73) Assignee: ING. SUMETZBERGER GMBH, Vienna (AT)

(*) Notice: Subject to any disclaimer, the term of this patent is extended or adjusted under 35 U.S.C. 154(b) by 0 days.

(21) Appl. No.: 16/345,291

(22) PCT Filed: Nov. 20, 2017

(86) PCT No.: PCT/AT2017/060305
§ 371 (c)(1),
(2) Date: May 17, 2019

(87) PCT Pub. No.: WO2018/094433
PCT Pub. Date: May 31, 2018

(65) Prior Publication Data
US 2019/0276248 A1    Sep. 12, 2019

(30) Foreign Application Priority Data
Nov. 24, 2016 (AT) .............................. A 51069/2016

(51) Int. Cl.
*B65G 51/36* (2006.01)
*B65G 51/06* (2006.01)
*B65G 51/30* (2006.01)

(52) U.S. Cl.
CPC ............. *B65G 51/36* (2013.01); *B65G 51/06* (2013.01); *B65G 51/30* (2013.01)

(58) Field of Classification Search
CPC ........ B65G 51/06; B65G 51/30; B65G 51/36; B65G 51/38
(Continued)

(56) References Cited

U.S. PATENT DOCUMENTS 1,638,047 A * 8/1927 MacLaren .............. B65G 51/06
406/37
3,331,569 A * 7/1967 Kelley ................... B65G 51/06
406/188
(Continued)

FOREIGN PATENT DOCUMENTS

CH      375274 B    3/1964
DE      433538 B    10/1928
(Continued)

*Primary Examiner* — William R Harp
(74) *Attorney, Agent, or Firm* — Andrew Wilford

(57) ABSTRACT

A pneumatic delivery capsule usable in a pneumatic delivery tube has a tubular side wall extending along and centered on a longitudinal axis, respective capsule heads fixed to respective axially opposite ends of the tubular side wall and dimensioned to slide with the tubular side wall inside the pneumatic delivery tube, and two axially spaced roller bearings each having an outer race fixed to the tubular side wall and an inner race. An insert is fixed to and extends longitudinally between the inner races for receiving an object to be transported. This insert is rotatable on the bearings in the tubular side wall about the longitudinal axis of the tubular side wall with a center of gravity of the insert together with the object to be transported being radially outward of the longitudinal axis.

5 Claims, 3 Drawing Sheets

(58) Field of Classification Search
USPC .................................................. 406/184–190
See application file for complete search history.

(56) References Cited

U.S. PATENT DOCUMENTS

| | | | | |
|---|---|---|---|---|
| 4,113,202 A | * | 9/1978 | Ueno | B65G 51/06 |
| | | | | 104/138.1 |
| 5,092,714 A | * | 3/1992 | Porter | B65G 51/26 |
| | | | | 406/186 |
| 6,015,246 A | * | 1/2000 | Yamane | B65G 51/06 |
| | | | | 406/184 |
| 6,062,398 A | * | 5/2000 | Thalmayr | B01L 9/06 |
| | | | | 206/443 |
| 8,463,427 B2 | | 6/2013 | Pedrazzini | |

FOREIGN PATENT DOCUMENTS

| | | |
|---|---|---|
| DE | 1238402 A | 4/1967 |
| EP | 2657160 A | 10/2013 |
| GB | 999621 B | 7/1965 |
| JP | 5027191 A | 10/1975 |
| WO | 2010131284 A | 11/2010 |
| WO | 2010136538 A | 12/2010 |
| WO | 2014081283 A | 5/2014 |

\* cited by examiner

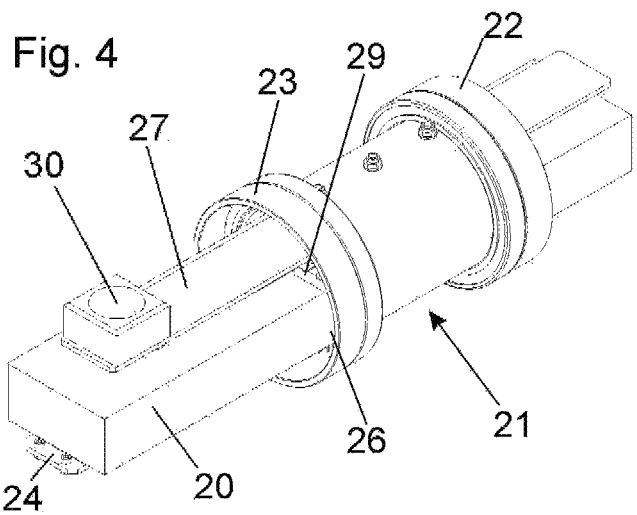
Fig. 4
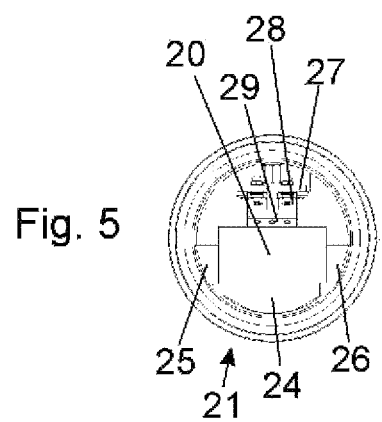
Fig. 5
Fig. 6
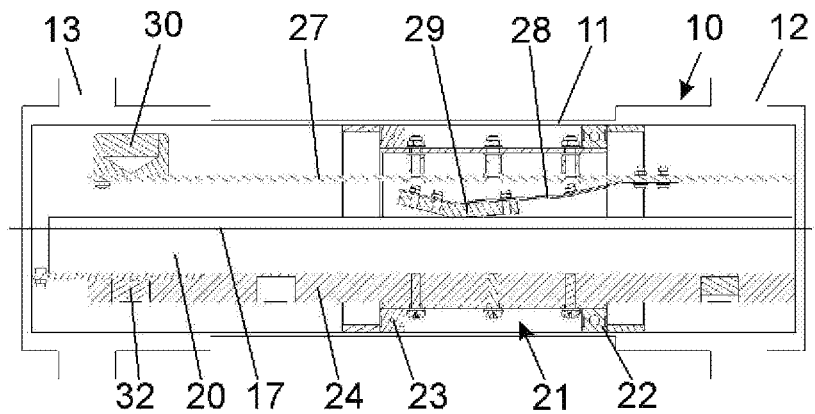

PNEUMATIC MAILING TUBE WITH INSERT

CROSS REFERENCE TO RELATED APPLICATIONS

This application is the US-national stage of PCT application PCT/AT2017/060305 filed 20 Nov. 2017 and claiming the priority of Austrian patent application A51069/2016 itself filed 24 Nov. 2016.

FIELD OF THE INVENTION

The present invention relates to a pneumatic delivery capsule with a tubular side wall, two capsule heads that are fixed thereto at the two ends of the tubular side wall, and an insert for receiving at least one object to be transported, for example a steel test rod.

PRIOR ART

Pneumatic tube systems transport a wide variety of objects. These can be very light objects such as sample tubes for blood samples, for example, that are sent to a laboratory for analysis. In this case, a plurality of objects (sample tubes) are usually transported in a pneumatic delivery capsule, and one can simply drop these sample tubes into a feed hopper of an analysis line, for example after receiving the pneumatic delivery capsule.

But they can also be heavy objects (weighing for example a few kilograms). In this case, the norm is for only one object, and no more than two objects, to be transported in a pneumatic delivery capsule. Such objects are currently removed by hand.

As automation progresses, it would be beneficial if such objects could be removed automatically by a robotic gripper arm. The problem that arises in this regard is that pneumatic delivery capsules are substantially circularly symmetrical on the outside and thus rotate in the tube about their own longitudinal axis. Even if the objects are always inserted the same manner at the sending station, they nevertheless arrive at the receiving station in random angular positions. In the absence of additional measures, the robotic gripper arm would need to be equipped with sensors that detect the angular position of the object so that the robot gripper arm can then be appropriately positioned (twisted) in order to grip the object. Apart from the additional expense of the sensors, the mechanics of the robotic gripper arm must also be improved such that it can be rotated exactly by a defined angle about the axis of the robotic gripper arm.

It is known from WO 2010/131284 that the entire tubular side wall can rotate relative to the capsule heads. The pneumatic delivery capsules described there are intended for very light objects, namely for banknotes. These pneumatic delivery capsules have rigid capsule heads and can be opened at a corresponding port in the tubular side wall. The tubular side wall has an eccentric ballast, so that it always has the same orientation under the influence of gravity (namely, such that the ballast is at the bottom). As a result, the port in the tubular side wall is always in the same position.

While this solution may be well suited for banknotes, heavier items pose mechanical problems. For heavier objects, it is better if the two capsule heads are rigidly connected to the tubular side wall and if the tubular side wall itself has no openings that weaken the tubular side wall.

OBJECT OF THE INVENTION

It is the object of the present invention to improve a pneumatic delivery capsule of the above-described type such that the transported object can be automatically gripped by a robot gripper arm without this robot gripper arm having to be equipped with additional functions (rotatability about the longitudinal axis of the robot gripper arm, sensors).

SUMMARY OF THE INVENTION

This object is achieved according to the invention by a pneumatic delivery capsule of the above-described type in that the insert is rotatable in the pneumatic delivery tube about the longitudinal axis of the tubular side wall, with the center of gravity of the insert together with the at least one object to be transported being outside the longitudinal axis.

When the pneumatic delivery capsule arrives horizontally at the receiving station, the insert together with the object to be transported always rotates in such a way that the center of gravity of the insert together with the object is as low as possible, so that the object to be transported thus always arrives in the same position and in the same orientation independently how much the pneumatic tube has turned about its longitudinal axis during travel.

An angular deviation of a few degrees is still possible, however, because the restoring force is low at low misalignments. (In a first approximation, it increases linearly with the angle of misalignment.)

In order to improve the positional accuracy, according to one embodiment of the present invention the insert is provided with at least one magnet or with at least one magnetizable material near the tubular side wall. In a pneumatic delivery station with a pneumatic tube for receiving such a pneumatic delivery capsule, the pneumatic tube is horizontal, and a permanent magnet or electromagnet is provided on the outside of the pneumatic tube that is opposite the magnet or the magnetizable material when the pneumatic delivery capsule is received. If a plurality of magnets or a plurality of magnetizable materials are provided on the insert, a permanent magnet or electromagnet is then provided on the outside of the pneumatic tube opposite each one.

The magnetic attraction can thus be multiplied. In order to prevent false pairings from arising, however, the magnets should not be offset from one another only in the circumferential direction.

Since the pneumatic delivery station also has a magnet in the corresponding location, the magnetic force takes over the fine positioning as soon as the two magnets (or the magnet and the magnetizable material) come closer to one another than, as a result of the positioning by gravity, is the case immediately after arrival at the receiving station.

In order for the object to be transported to be securely held in the insert (which is necessary for accurate positioning), it is expedient if the insert has a channel for receiving the object to be transported into which at least one spring-loaded pressure element projects.

If the object to be transported is magnetizable, it is also favorable if the insert has at least one permanent magnet near the object to be transported. This increases the force necessary to move the object relative to the insert.

BRIEF DESCRIPTION OF THE DRAWINGS

The present invention will be explained in further detail on the basis of the enclosed drawings, in which:

FIGS. 4 to 6 show the same insert in views corresponding to those shown in FIGS. 1 to 3, but with an inserted test rod.

MANNER(S) OF CARRYING OUT THE INVENTION

During the production of steel pipes for the oil industry, the quality must be constantly monitored. For this purpose, standard (cuboid) test rods for testing tensile strength and the like are cut out of the steel tubes during production and provided with a barcode label for identification.

These test rods, with a tare weight of up to 6 kg, are then manually loaded into a pneumatic delivery capsule and sent by pneumatic tube to the analysis laboratory. Pneumatic delivery capsules according to the invention are employed to ensure that the material samples can be removed from the pneumatic delivery capsule in an automated process in the analysis laboratory and stored in a storage system for test rods.

In order to enable removal by a robotic gripping arm, high demands are placed on the positioning, orientation, and location of the test rods: The test rods must always have the same alignment (for example be horizontally aligned), with a maximum angle error of 5°, upon arrival at the station.

Figure 7:
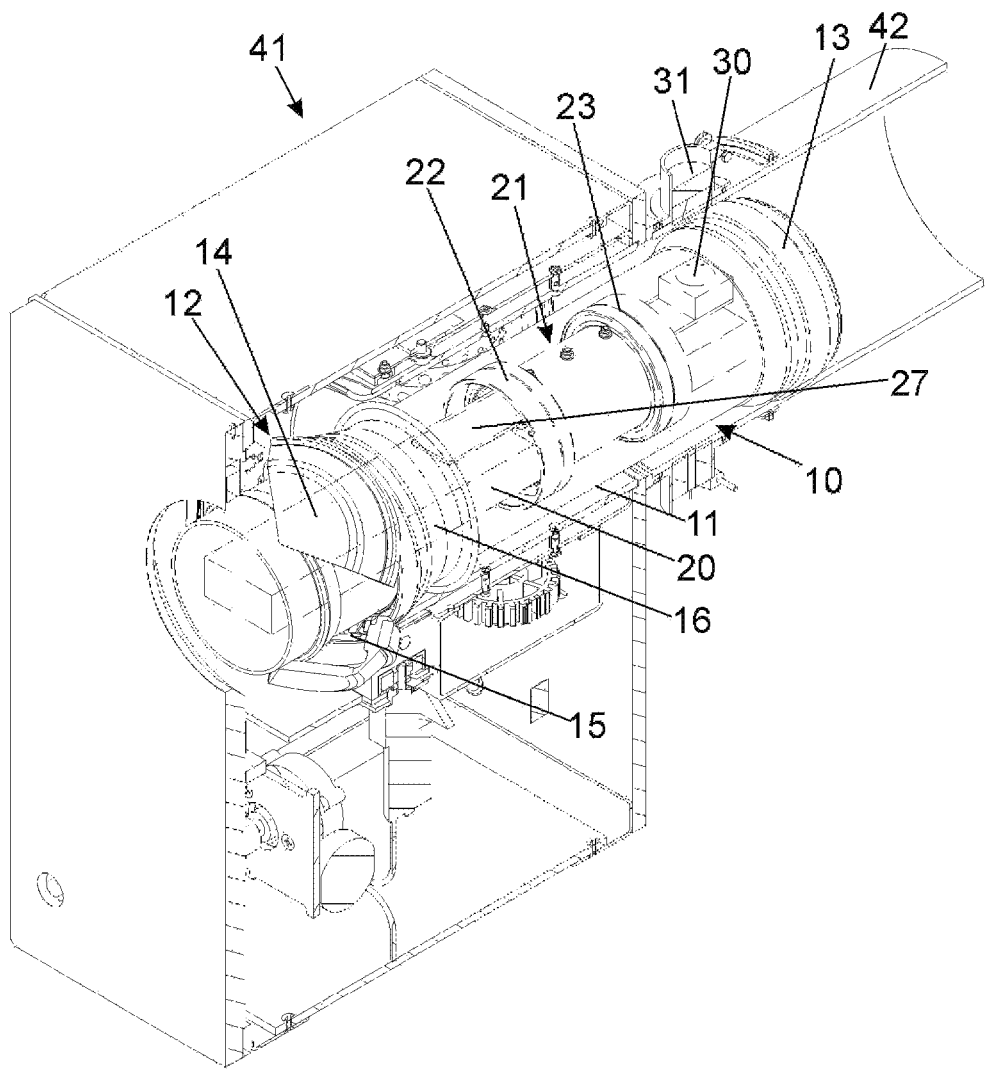
FIG. 7 shows a pneumatic delivery capsule according to the invention with insert at a pneumatic delivery station.

In this embodiment, the pneumatic delivery capsule 10 (see FIG. 7) has a tubular side wall 11 and capsule heads 12 and 13 at opposite ends. The capsule head 12 is embodied as described in WO 2010/136538, i.e. it has a cover subdivided into a plurality of (for example three) sectors 14. Each sector 14 can be pivoted about its own axle 15 to extend tangentially to the longitudinal axis of the capsule. The pivot axles are supported in an actuating ring 16 that surrounds the tubular side wall 11. If the actuating ring 16 is moved, the cover opens (shown in FIG. 7). The capsule head 13 can be permanently closed, or the cover can be pivoted away about an axis that is parallel to the capsule longitudinal axis and near the tubular side wall 11. The exact design of the pneumatic delivery capsule 10 is however not important.

It is important that an insert 21 be inserted in the pneumatic delivery capsule 10. This insert 21 has two ball bearings 22 and 23. The outer races of the ball bearings 22 and 23 are anchored to the tubular side wall 11. The insert 21 can thus rotate freely relative to the tubular side wall 11.

Figure 1:
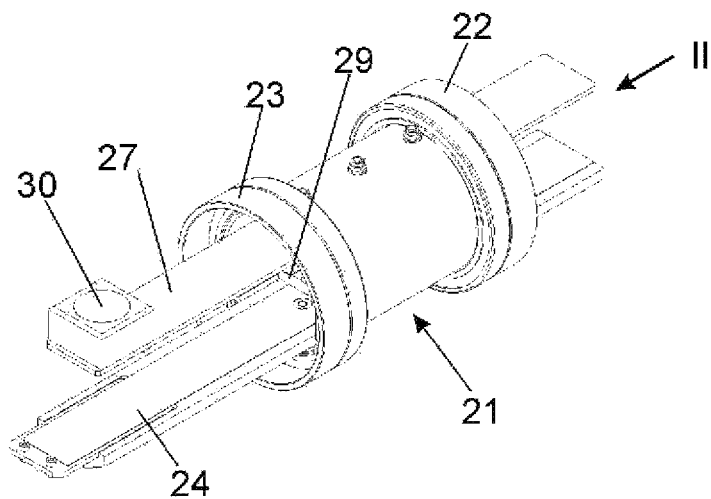
FIG. 1 shows an insert for a pneumatic delivery capsule in a perspective view.
Figure 2:
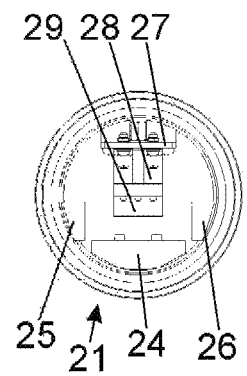
FIG. 2 shows the insert in an end view in the direction of the arrow II of FIG. 1.
Figure 3:
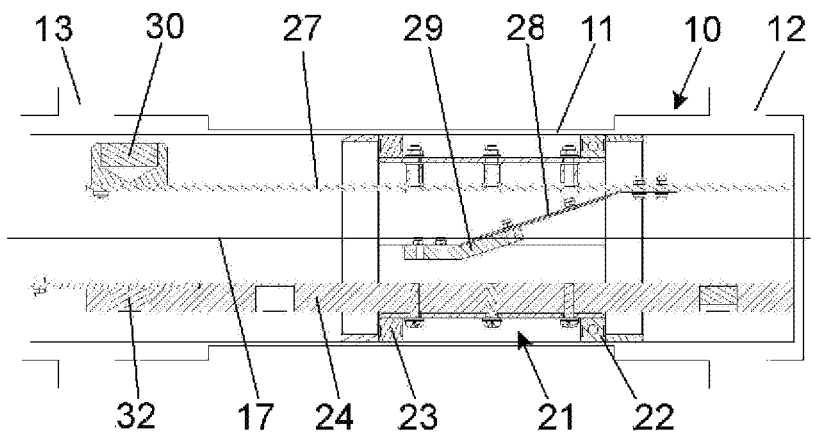
FIG. 3 is a longitudinal section through the insert that is inserted into a schematically indicated pneumatic delivery capsule.

The insert 21 has a lower support 24 (see FIGS. 1 to 6) and two side supports 25 and 26 (see FIGS. 2 and 5) that form a channel into which a test rod 20 (see FIGS. 4 to 6) can be inserted. Since the center of gravity of the insert 21 together with the test rod 20 is located radially outward of the axis of rotation of the insert, i.e. the longitudinal axis 17 (see FIG. 6) of the tubular side wall 11, the insert 21 always rotates so that the test rod 20 is as low as possible.

A support 27 is fixed in the insert 21 opposite the lower support 24. A pressing member 29 is attached to this support 27 by a leaf spring 28 (see FIGS. 2, 3, 5 and 6). Upon insertion of the test rod 20, the pressing member 29 is deflected upward (see FIG. 6), so that it elastically presses down the test rod 20 by the elasticity of the leaf spring 28.

Furthermore, a permanent magnet 32 is provided on the support 24 that also holds down the test rod 20. As a result, the test rod 20 is held stably and securely in the pneumatic delivery capsule during transport in the pipeline, and the force that the robotic gripper arm must exert for removal does not exceed 70 N.

Finally, a magnet 30 is attached to the support 27 that is located near the tubular side wall 11. This magnet 30 cooperates with a permanent magnet 31 (see FIG. 7) of the pneumatic delivery station 41, so that the insert 21 together with the test rod 20 is aligned precisely. In fact, this magnetic force causes the two magnets 30 and 31 to be situated precisely opposite one another as soon as they come close to one another. This is automatically the case after arrival of the pneumatic delivery capsule 10, because the tube 42 of the pneumatic delivery station is horizontal, so that the pneumatic delivery capsule 10 is also horizontal and the test rod 20 in its the lowest position.

The invention claimed is:

1. A pneumatic delivery capsule usable in a pneumatic delivery tube, the capsule comprising:
    a tubular side wall extending along and centered on a longitudinal axis;
    respective capsule heads fixed to respective axially opposite ends of the tubular side wall and dimensioned to slide with the tubular side wall inside the pneumatic delivery tube;
    two axially spaced roller bearings each having an outer race fixed to the tubular side wall and an inner race; and
    an insert fixed to and extending longitudinally between the inner races for receiving an object to be transported, the insert being rotatable on the bearings in the tubular side wall about the longitudinal axis of the tubular side wall with a center of gravity of the insert together with the object to be transported being radially outward of the longitudinal axis.

2. The pneumatic delivery capsule according to claim 1, wherein the insert is provided with at least one magnet or with at least one magnetizable mass near the tubular side wall.

3. The pneumatic delivery capsule according to claim 1, wherein the insert forms a channel for receiving the object to be transported, the capsule further comprising:
    a spring-loaded pressing member projecting into the channel and positioned to press the object radially outward.

4. The pneumatic delivery capsule according to claim 1, further comprising:
    a permanent magnet on the insert near the object to be transported.

5. A pneumatic delivery station with a pneumatic tube for receiving a pneumatic delivery capsule according to claim 2, wherein the pneumatic tube is horizontal and a permanent magnet or electromagnet is provided externally of the pneumatic tube opposite the magnet or the magnetizable material on the insert when the pneumatic delivery capsule is received in the station.

\* \* \* \* \*